US009865240B2

(12) United States Patent
Bauer

(10) Patent No.: US 9,865,240 B2
(45) Date of Patent: Jan. 9, 2018

(54) COMMAND INTERFACE FOR GENERATING PERSONALIZED AUDIO CONTENT

(75) Inventor: Lee Bauer, Grosse Pointe Farms, MI (US)

(73) Assignee: Harman International Industries, Incorporated, Stamford, CT (US)

(*) Notice: Subject to any disclaimer, the term of this patent is extended or adjusted under 35 U.S.C. 154(b) by 811 days.

(21) Appl. No.: 11/960,647

(22) Filed: Dec. 19, 2007

(65) Prior Publication Data
US 2008/0162147 A1 Jul. 3, 2008

Related U.S. Application Data

(60) Provisional application No. 60/882,734, filed on Dec. 29, 2006, provisional application No. 60/938,563, filed on May 17, 2007.

(51) Int. Cl.
G10L 25/00 (2013.01)
G10H 1/00 (2006.01)
G06F 17/30 (2006.01)
G11B 27/034 (2006.01)
G11B 27/10 (2006.01)
G11B 27/11 (2006.01)

(52) U.S. Cl.
CPC ..... *G10H 1/0058* (2013.01); *G06F 17/30026* (2013.01); *G06F 17/30032* (2013.01); *G06F 17/30044* (2013.01); *G06F 17/30053* (2013.01); *G11B 27/034* (2013.01); *G11B 27/105* (2013.01); *G11B 27/11* (2013.01); G10H 2220/106 (2013.01); G10H 2240/081 (2013.01); G10H 2240/105 (2013.01); G10H 2240/131 (2013.01); G10H 2240/211 (2013.01)

(58) Field of Classification Search
CPC ......... G06F 17/30749; G06F 17/30758; G06F 17/30775; G06F 3/0483; G10L 25/48; G10L 19/00; G10L 25/81; G10H 2240/102; G10H 2240/105; G10H 2240/131; G10H 2240/211
USPC .................................... 704/275, 270, 270.1
See application file for complete search history.

(56) References Cited

U.S. PATENT DOCUMENTS

| 5,864,868 | A  | * | 1/1999  | Contois         |         |
|-----------|----|---|---------|-----------------|---------|
| 6,167,370 | A  | * | 12/2000 | Tsourikov et al.| 704/9   |
| 6,186,553 | B1 | * | 2/2001  | Phillips et al. | 283/2   |
| 6,572,381 | B1 | * | 6/2003  | Tsai            | 434/307 A |

(Continued)

FOREIGN PATENT DOCUMENTS

WO WO03036957 A1 5/2003
WO WO /2006050731 A2 5/2006

*Primary Examiner* — Abdelali Serrou
(74) *Attorney, Agent, or Firm* — McCoy Russell LLP

(57) ABSTRACT

The personalized content system of the system combines a summary music identification value creation and identification algorithm that represents a mathematical summary music identification of a song, an audio file, or other relational music criteria and data (e.g title, artist, genre, style, beats per minute, etc.) or any combination thereof. The derived value represents the musical taste or style attributes of a song or style. The user can control the system by issuing one of a plurality of commands comprising artist command, song/title command, genre command, and album/filtered list command. These commands then lead to command trees that may be used in a voice controlled system, for example.

8 Claims, 12 Drawing Sheets

(56) References Cited

U.S. PATENT DOCUMENTS

| | | | |
|---|---|---|---|
| 6,757,517 B2* | 6/2004 | Chang | H04W 4/08 455/186.1 |
| 6,993,532 B1 | 1/2006 | Platt et al. | |
| 7,028,082 B1* | 4/2006 | Rosenberg | H04H 60/02 707/999.104 |
| 7,031,477 B1* | 4/2006 | Mella et al. | 381/86 |
| 7,065,342 B1* | 6/2006 | Rolf | 455/412.1 |
| 7,143,939 B2* | 12/2006 | Henzerling | G11B 31/003 235/435 |
| 7,197,455 B1* | 3/2007 | Sudo et al. | 704/231 |
| 7,421,391 B1* | 9/2008 | Merkel | 704/270 |
| 7,444,353 B1* | 10/2008 | Chen | G06F 17/30743 |
| 7,521,623 B2* | 4/2009 | Bowen | 84/612 |
| 7,599,685 B2* | 10/2009 | Goldberg | G10H 1/0025 455/3.06 |
| 7,725,475 B1* | 5/2010 | Alspector et al. | 707/758 |
| 7,797,446 B2* | 9/2010 | Heller | G11B 27/002 707/E17.109 |
| 8,060,225 B2* | 11/2011 | Hans | G10H 1/0058 379/206.01 |
| 8,103,009 B2* | 1/2012 | McCarty | H04B 3/54 381/104 |
| 8,543,095 B2* | 9/2013 | Brown | H04H 60/73 370/259 |
| 2001/0014852 A1* | 8/2001 | Tsourikov et al. | 704/9 |
| 2004/0019396 A1* | 1/2004 | McMahon | G11B 27/034 700/94 |
| 2004/0128141 A1* | 7/2004 | Murase et al. | 704/275 |
| 2004/0176959 A1* | 9/2004 | Wilhelm et al. | 704/275 |
| 2004/0192191 A1* | 9/2004 | Toporski et al. | 455/3.06 |
| 2004/0243482 A1* | 12/2004 | Laut | 705/27 |
| 2004/0254659 A1* | 12/2004 | Bolas | G06F 17/30017 700/94 |
| 2005/0021470 A1 | 1/2005 | Martin et al. | |
| 2005/0049862 A1* | 3/2005 | Choi et al. | 704/231 |
| 2005/0289600 A1* | 12/2005 | Kawahara | G11B 27/034 725/53 |
| 2006/0080103 A1* | 4/2006 | Van Breemen | 704/270 |
| 2006/0123053 A1* | 6/2006 | Scannell, Jr. | 707/104.1 |
| 2006/0169126 A1* | 8/2006 | Ishiwata et al. | 84/615 |
| 2006/0224260 A1 | 10/2006 | Hicken et al. | |
| 2006/0236219 A1* | 10/2006 | Grigorovitch et al. | 715/500.1 |
| 2006/0242106 A1* | 10/2006 | Bank | G06F 17/30038 |
| 2006/0265421 A1* | 11/2006 | Ranasinghe | G06F 17/30743 |
| 2007/0079352 A1* | 4/2007 | Klein, Jr. | H04N 7/17318 725/135 |
| 2007/0094028 A1* | 4/2007 | Lu et al. | 704/258 |
| 2007/0106406 A1* | 5/2007 | Makino et al. | 700/94 |
| 2007/0143526 A1* | 6/2007 | Bontempi | 711/100 |
| 2007/0162166 A1* | 7/2007 | Ni et al. | 700/94 |
| 2007/0162437 A1* | 7/2007 | Hwang | 707/4 |
| 2007/0220552 A1* | 9/2007 | Juster et al. | 725/46 |
| 2007/0291404 A1* | 12/2007 | Morse et al. | 360/81 |
| 2007/0294292 A1* | 12/2007 | Hydrie | G06F 17/30053 |
| 2008/0130699 A1* | 6/2008 | Ma et al. | 372/50.12 |
| 2008/0133441 A1* | 6/2008 | West et al. | 706/46 |
| 2008/0156173 A1* | 7/2008 | Bauer | 84/601 |

\* cited by examiner

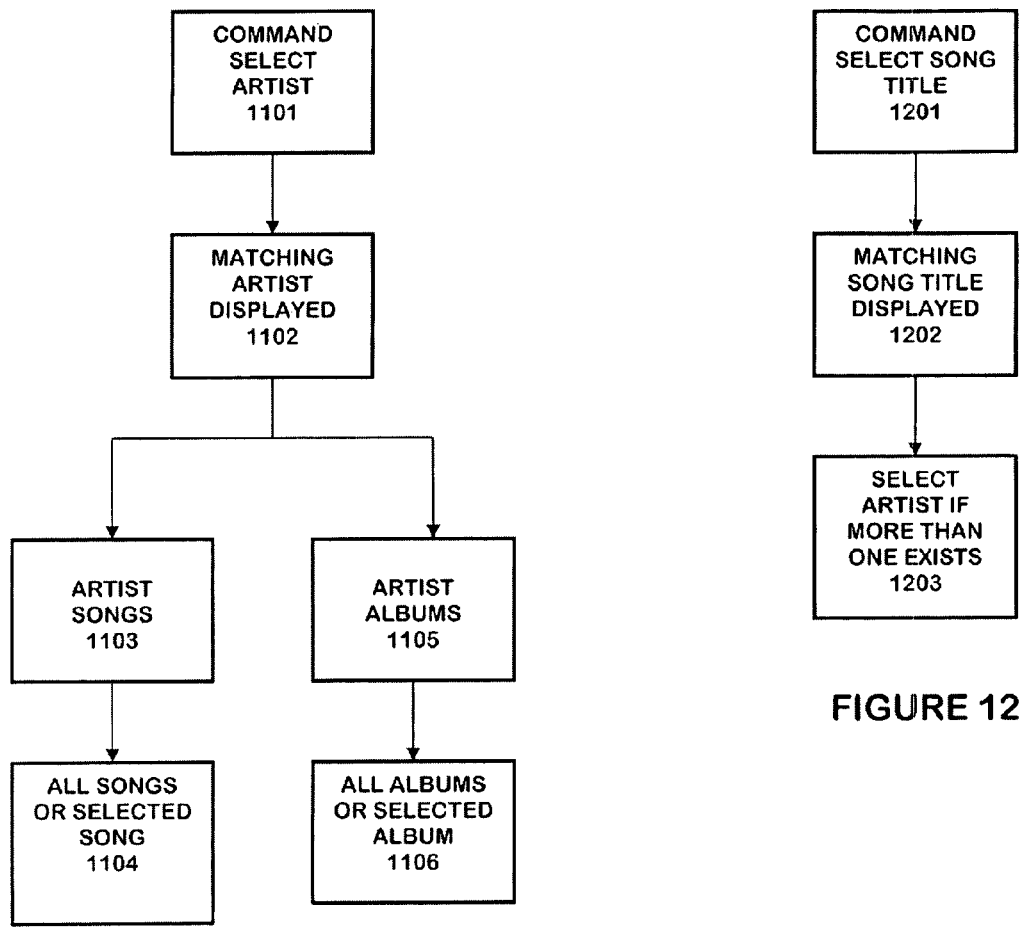
FIGURE 11
FIGURE 12
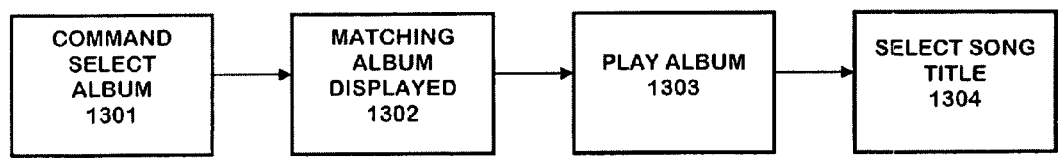
FIGURE 13

COMMAND INTERFACE FOR GENERATING PERSONALIZED AUDIO CONTENT

RELATED APPLICATIONS

This application claims priority to U.S. Provisional Patent Application Ser. No. 60/882,734, entitled "Vehicle Infotainment System with Personalized Content," and filed on Dec. 29, 2006, and is incorporated herein in its entirety by reference; and U.S. Provisional Patent Application Ser. No. 60/938,563 entitled "Vehicle Infotainment System With Personalized Content" filed on May 17, 2007 and incorporated herein in its entirety by reference.

BACKGROUND OF THE SYSTEM

1. Technical Field

The system is directed to the field of infotainment systems. More particularly, this system provides a way to provide personalized content to a user while reducing the active control of the system by the user.

2. Related Art

Infotainment systems are well known in the art and are widely used for various purposes. Generally, infotainment systems are used for providing information to the user. The information provided to the user may be stored in the infotainment system (such as a motion picture on a Digital Versatile Disc), may be received by the infotainment system from other sources (such as a broadcasted radio or television program), or may be generated by the infotainment system based on certain input data such as time of the day, current location, or the like (such as a portable navigation device). The information is typically provided to the user in acoustic form, in visual form, or in a combination thereof.

There is a need for providing infotainment systems that are adapted to the specific needs of the driver or the passenger of a vehicle such as an automobile. During long journeys the driver and the passengers desire to be entertained by being provided with information. The driver in particular may be supported by information such as navigation instructions that are provided by the infotainment system.

A disadvantage of prior art systems is the inflexibility in personalizing content and entertainment for one or more users. The current state of the art comprises predefined radio stations or content providers/sources that are programmed remotely. These stations have a particular programming format or genre and are rigid in structure. They currently cannot be personalized in any way by the user/consumer for in-vehicle consumption. The listener can choose among these stations/sources, but once a station is selected, the user is captive to the play list of that station or source.

Whereas conventional analog radio provided at most a few tens of different receivable stations, the number of available channels has multiplied about tenfold with the introduction of digital audio broadcasts in particular with the introduction of satellite-based digital radio services (Satellite Digital Audio Radio Service, SDARS). Another increase by a factor of ten is to be expected with the advent of in-car Internet connectivity allowing a user to access thousands of Internet radio stations.

There is a large variety of competing digital audio broadcasting systems, which differ with respect to transmission technology (terrestrial versus satellite-based systems, systems adapted for mobile or stationary receivers, modulation schemes, frequency bands, etc.), coding methods (systems employing proprietary or open standards, different codecs and encryptions), and business models (free radio systems, subscription-based content delivery, pay-per-item or download). Most of the satellite-based systems, for instance, are proprietary, using different codecs for audio data compression, different modulation techniques, and/or different methods for encryption and conditional access.

Common to all digital audio broadcasting systems is that digital audio information is transmitted in compressed form in order to economize transmission bandwidth and/or to improve transmission quality. Lossy data compression is achieved by employing a psychoacoustic model of the human auditory system to decide what information can be neglected without adversely affecting the listening experience. Coding and decoding of the audio information is performed by methods collectively termed codecs. Prominent examples of codecs employed in connection with digital audio broadcasting are MUSICAM (Masking pattern adapted Universal Subband Integrated Coding And Multiplexing), AAC (Advanced Audio Coding), and MP3, more precisely referred to as MPEG-1 Audio Layer 3 (Motion Picture Expert Group).

MP3 for instance, is a popular digital audio encoding and lossy compression format, designed to greatly reduce the amount of data required to represent audio, yet still sound like a faithful reproduction of the original uncompressed audio to most listeners. It provides a representation of pulse-code modulation-encoded audio in much less space than straightforward methods, by using the above-mentioned psychoacoustic models to discard components less audible to human hearing, and recording the remaining information in a highly efficient manner based on entropy coding schemes. MP3 audio can be compressed with several different bit rates, providing a range of tradeoffs between data size and sound quality.

An MP3 file is made up of multiple independent MP3 frames which consist of the MP3 header and the MP3 data. This sequence of frames is called an elementary stream. The MP3 data is the actual audio payload. The MP3 header consists of a sync word, which is used to identify the beginning of a valid frame, followed by a bit indicating that this is the MPEG standard and two bits that indicate that layer 3 is being used, hence MPEG-1 Audio Layer 3. After this, the values will differ depending on the MP3 file. The range of values for each section of the header along with the specification of the header is defined by ISO/IEC 11172-3.

In addition to the proper audio data, most digital audio broadcasting systems also transmit program-associated data (PAD or meta data) with the artist and title of each song or program, and possibly the name of the channel. The meta data may for instance be decoded by the receiver for channel identification and display purposes.

MP3 files, for instance, may contain ID3 meta data containers (ID3v1 and ID3v2) which precede or follow the MP3 frames. These meta data containers allow information such as title, artist, album, track number, or other information about the file to be stored in the file itself.

The ID3v1 container occupies 128 bytes, beginning with the string TAG. The small container size only allows for 30 bytes for the title, artist, album, and a "comment", 4 bytes for the year, and a byte to identify the genre of the song from a list of 80 predefined values. On the other hand, ID3v2 tags are of variable size, and are usually positioned at the start of a file in order to facilitate streaming. They consist of a number of frames, each of which contains a piece of meta data. Frames can be 16 MB in length.

In the latest ID3v2 standard there are 84 predefined types of frame. In particular, there are standard frames for containing title, cover art, copyright and license, lyrics, arbitrary text, and URL data, as well as other information. The TIT2 frame, for example, contains the title, and the WOAR frame contains the URL of the artist's website.

Digital audio broadcasting systems generally "stream" the audio data to their clients. Streaming media is media that is consumed (heard or viewed) while it is being delivered—just as the traditional analog broadcasting systems, but in contrast to certain Internet content providers, which require a complete download of a file prior to playing it.

Satellite Digital Audio Radio Service (SDARS), for instance, is a satellite based radio system for broadcasting CD-like music and talk shows to mobile and fixed receivers. SDARS is operated in North America by two providers, XM Radio and Sirius Radio, which intend to offer approximately 100 channels. Each provider has launched satellites in either a geostationary or a highly elliptical orbit in order to relay the broadcast signal from a ground station.

SDARS operates in the 2.3-GHz S band, i.e. from 2320 to 2345 MHz. SDARS receivers are able to directly receive the satellite's line-of-sight signals via small-sized antennas. Terrestrial repeaters retransmit the signals in areas that are prone to weak signals, due to overhead obstructions like tall buildings in downtown areas. The SDARS receivers are designed to receive one or two of the satellite signals and the non-line-of-sight signals from terrestrial repeaters.

SDARS requires the user to subscribe to the provider's service. This is facilitated in that each SDARS receiver has an Electronic Serial Number (ESN)—Radio ID to identify it. When a unit is activated with a subscription, an authorization code is sent in the digital stream telling the receiver 100 to allow access to the blocked channels.

An example for a terrestrial digital radio technology is HD Radio, which has been selected by the Federal Communications Commission (FCC) as the standard for local area broadcasts within the United States. HD Radio offers multiple programs with CD quality on one channel and operates on the same frequencies allocated to analog (FM and AM) radio stations.

HD Radio is short for Hybrid Digital Radio, referring to the fact that analog and digital signals are transmitted simultaneously on the same channel. In hybrid mode, a conventional AM or FM signal is transmitted at the channel's center frequency whereas the digital signal is transmitted at the sidebands.

Digital Audio Broadcasting (DAB) is the European counterpart to HD Radio in the United States. DAB has been designated as the follow-up system for the conventional analog radio and uses the frequency bands III (174-230 MHz) L (1452-1492 MHz).

Finally, Internet radio is also a form of digital audio broadcast growing more and more popular. Broadcasting on the Internet is usually referred to as netcasting since it is delivered over a network and not transmitted broadly. In contrast to the above digital audio broadcasting systems, the transmission method is thus not specified, but may for example be WLAN or UMTS.

With a conventional radio it is not possible to select the music you want to hear but rather search for music on the various channels in a manual fashion. With the advent of the various forms of digital radio broadcasting, the number of receivable channels is ever increasing. Given the enormous number of digital radio channels that can be received via satellite, terrestrial broadcasting stations, and the Internet, selecting music that you want to hear is a manually intensive effort.

Especially in cars, digital communication capabilities are expected to become more and more ubiquitous in the near future. Therefore, modern in-car entertainment systems will not only comprise conventional receivers for free radio and subscription based media providers such as SDARS, but also bidirectional communication links for music downloads and Internet radio. With all this content it is very difficult to have a structured listening experience that allows the user to listen to preferred music during each trip.

Studies have shown that interaction with devices in the vehicle, such as cell phones, can increase the risk of accidents. It will be important to have a scheme for allowing personalization of content selection while simplifying management and selection of content.

SUMMARY

As we make the transition over the next decade to ubiquitous wireless broadband with acceptable quality of service (QoS) consumers will have the ability to choose non traditional sources for their entertainment. Given this access to the internet in mobile settings a consumer will have the power to individually define the music to which they wish to listen. The vehicle presents a problem in such a system as it is a very distraction sensitive environment. Furthermore, with almost endless content options, management will be very challenging. While internet radio stations will exist, proliferate and be numerous, the tendency to be more of a distraction, not less, when streamed into the vehicle is real and predictable.

The personalized content system of the system combines a summary music identification value creation and identification algorithm. This creation algorithm of the system may create a summary music identification value. The identification algorithm of the system can interpret this summary music identification value. This summary music identification value can be of a song, an audio file, or other relational music criteria and data (e.g title, artist, genre, style, beats per minute, etc.) or any combination thereof. The derived value represents the musical taste, acoustic characteristics or style attributes of a song or audio file. The analysis and generation of the summary music identification value can either be processed locally (in Vehicle) or remotely (Web Based) in whole or in part or can be obtained from a local or remote database. This summary music identification value acquisition may operate in the background where little attention by the user is necessary and vehicle distraction and thus safety is not an issue. A user can generate a single summary music identification value or can generate multiple summary music identification values for different criteria. For example, summary music identification values can be defined temporally, such as for morning drive time. In other cases, summary music identification values can be defined for a genre, but with a much more personal touch possible than with fixed playlist radio stations/content providers. In another embodiment, a user can obtain and use someone else's summary music identification value(s) (e.g. a celebrity, artist, friend, etc.) and use it with the system.

In one embodiment, the personalized content system utilizes an OEM infotainment system comprising a head unit with some form of internet capability either directly though the head unit or via a connectivity module that is either included inside the head unit or may reside as a separate module In one embodiment, the personalized content system utilizes an OEM infotainment system comprising a two device approach. The first device is an integrated automotive infotainment processing unit that provides base functionality, in-vehicle network connectivity and provisions for an external interface for command and control to and of a second device. The second device can be a personal connectivity device or (PCD) or could also be a smartphone, external mass storage, external smart mass storage, PDA, media-player, UMPC or even PC, is portable and may be an upgradeable processing device that is in communication with the installed first device either wired or wirelessly. In one embodiment, the PCD or other devices may actually dock with the base unit physically and in another embodiment interfaces wired (USB, Ethernet, etc) or wirelessly (Bluetooth, WiFi, UWB etc.). This pairing of these two devices enables the potential for a virtually unlimited scalable functionality with unparalleled personal portability and connectivity.

In another embodiment the second device may also be any player with mass storage with wired or wireless connectivity to the head unit. The second device can be implemented with or without wired or wireless connectivity to the internet.

In one embodiment of the system, a voice recognition system or other voice activated system can be used to manage the device and to select the playlist capability. This further reduces distraction in the vehicle environment by eliminating the need to manually manipulate devices other than those immediately related to controlling the vehicle. The voice activated system could be used to access content and data wherever sourced, including, by way of example, a locally stored content library, or a remotely provided content source.

In one embodiment the voice recognition may involve local pre-processing either on the head unit or second device with final processing accomplished remotely on a server related to the music server. In this form, a voice command is delivered to a server that initiates a summary music identification value transfer in order to generate a custom return media (decoded stream) or file transfer (data (packet) stream) or call a particular music identification value that resides remotely.

Although one embodiment of the system is described in connection with a vehicle based infotainment system, the system has equal application to non-vehicle based systems as well, without departing from the scope or spirit of the system.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the Figures are not necessarily to scale, emphasis instead being placed upon illustrating the principles of the invention. Moreover, in the Figures, like reference numerals designate corresponding parts throughout the different views.

FIG. 11 is a flow diagram illustrating the selection of content by specifying an artist.

FIG. 12 is a flow diagram illustrating the selection of content by specifying a song title.

FIG. 13 is a flow diagram illustrating the selection of content by specifying an album.

DETAILED DESCRIPTION OF THE SYSTEM

In describing the system in one embodiment, certain phrases are given the meanings set out below.

Operation of the System

Figure 1:
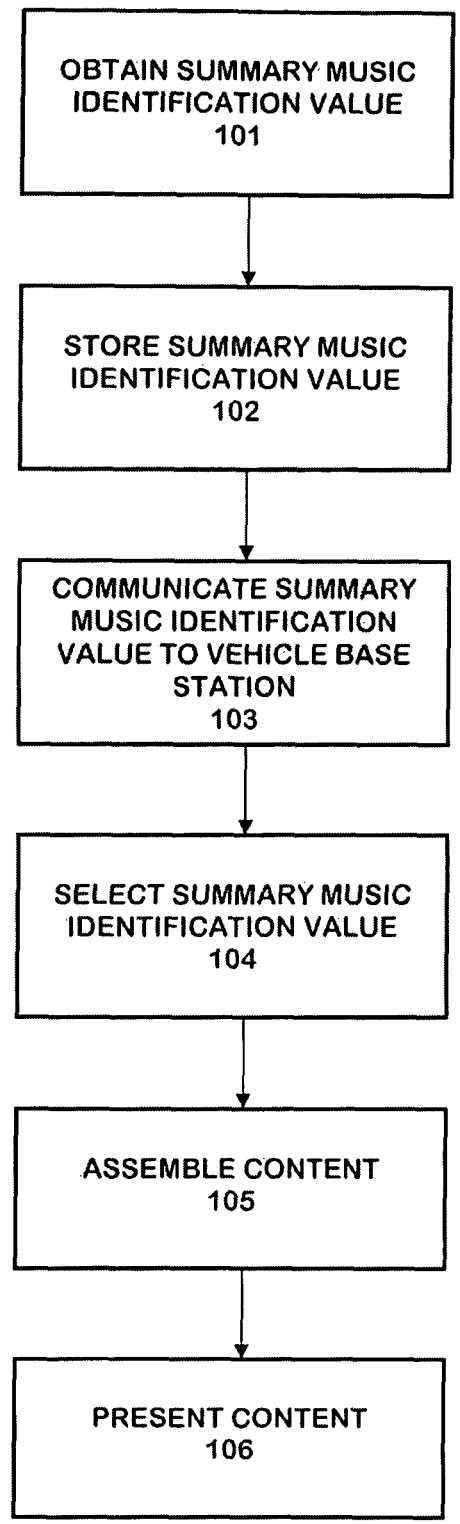
FIG. 1 is a flow diagram illustrating the generation of a playlist using the system.

FIG. 1 is a flow diagram illustrating the generation of a playlist using the system. At step 101 a summary music identification value is obtained. As noted above, this can be done by the user based on songs, audio files or genres, or by obtaining a pre-existing third party summary music identification values. These summary music identification values can be numerical, textual, symbolic, vectors or a combination or string thereof. When interpreted by an algorithm the values can be used to identify content (e.g. songs and/or a playlist) that has a summary music identification value within a range of the selected value. At step 102 the summary music identification value is stored in memory. In one embodiment, this comprises storing the summary music identification value on a secondary device. At step 103 the user is in a vehicle and the summary music identification value storage device (and the summary music identification value or values are communicated to the vehicle base station unit.

At step 104 the user selects a summary music identification value. At step 105 the vehicle base unit assembles content based on the summary music identification value. At step 106 the assembled content is present for enjoyment by the user.

In one embodiment, the user can implement a steering algorithm that allows the user to vary the boundaries or limits of the relationship between the summary music identification values and the selected content. In other words, the acceptable range of matching between the summary music identification value of the user and the summary music identification value of each song may be varied and thus create non deterministic outcomes. The result is that the same summary music identification value can produce very different playlists depending on the matching range.

Personalized Content

Many vehicle owners have both radio and some subscription media content provider like SDARS. While there are many content sources/channels the content itself is generally filtered and delivered to the user in a pre-packaged/programmed format that is rigid and structured according to base criteria or programming format of the station itself (e.g. play lists). This system is a method by which a user can generate custom streamed radio channel(s) for an in-vehicle application. The system contemplates in one embodiment the ability to access networks such as the Internet from a vehicle and the ability to obtain content dynamically from one or more sources. The system accomplishes this by creating customized and personalized playlists that in effect create a personalized radio station for the user.

There is also the possibility that there are other content sources that can be considered simultaneously. In this form, the construction of a personalized media stream would proceed with a music summary identification value but would access all available sources that may include not only the internet but also any local or remote mass storage, media players and other servers.

Playlist Creation

The creation of one or more playlists in the system is accomplished in one embodiment in two parts. First a summary music identification value is determined. Secondly, a content source(s) is accessed to select content that matches appropriately or relates within a given range to the summary music identification value.

Summary Music Identification Values

A summary music identification value in one embodiment of this system is a value that represents key attributes of a song including but not limited to all acoustic properties and available meta data. It is quite conceivable that two songs could have the same summary music identification value. This can occur, for example, with a song performed in two languages (e.g. English and Spanish). In a metadata-less environment it is certainly possible that these two songs in English and Spanish may have substantially similar if not identical summary music identification values. When generating playlists this is acceptable. So, the summary music identification values may or may not be unique. The summary music identification value is for the purpose of generating "more like this", "less like this" and any variation, iteration, extrapolation thereof. When considering summary music identification values, each individually can be considered as a value in n-space or vector space. When you take any combination of values one can determine a relative distance between values and thus boundaries if desired.

Creating a summary music identification value is accomplished by using locally available summary music identification value and identification algorithms, so that a user can derive a summary music identification value from a song(s), audio file(s) or other relational music criteria/data. The summary musical identification may be based on a song, a library of songs or other media content, by responses to questions and answers, or by any other suitable means. This "value" may summarize in whole or in part the type, taste, style attributes and acoustic characteristics of the underlying song(s), audio file(s) selected. Alternatively, the user may choose to use remotely generated summary music identification values for the same purpose. Using the summary music identification value allows the user to generate a custom, personalized playlist by making a single selection (the summary music identification value or the song related to the summary music identification value—Individual summary music identification values may be either archived in the header (tag) of the song or separately in a local or remote database that maintains the relationship between the song and the summary music identification value. They may also be generated on the fly.) Average values (the average of more than one summary music identification value) would be stored in a database. This provides the rich experience of custom content without the distractions of programming, seeking, or other possible distractions common when attempting to find the right content.

The summary music identification value will be made available in one embodiment by:

1. processing acoustic characteristics and/or existing criteria such as meta data;
2. generating/calculating summary music identification values from music libraries and their content locally; or
3. acquiring summary music identification values remotely.

As noted above, there are a number of ways to obtain a summary music identification value for use with the system. The system contemplates the ability to utilize summary music identification value(s) generated from any number of algorithms that currently exist or that may be created. For example, there is a system known as "MusicIP" described as a "music matching technology that defines relationships between sets of music based on acoustic traits and characteristics." The MusicIP system allows the obtaining and generation of metadata associated with musical files and permits the creation of summary music identification value (s) for use with the system. The system may also take advantage of other musical identification techniques such as the Gracenote MusicalID system and micro-genre classification system.

Another technique for generating summary music identification values is the Pandora system. The Pandora system describes a musical genome project that attempts to capture the essence of music by identifying the "genes" that compare any musical content. A user of Pandora can generate a custom "radio station" by selecting a single song or artist. The Pandora system then generates a playlist based on the musical genes of the selected song or artist. Personalization can be refined by indicating like or dislike of songs presented to the user.

The above systems are given by way of example. Any other system of generating a summary music identification value can be used without departing from the scope or spirit of the system.

Another method of deriving a summary music identification value is via the analysis of a library of content in whole or in part. For example, the user may subject his or her entire music library to analysis to create a more personalized or generalized summary music identification value that is user specific. In other cases, the user may analyze a collection of the user's content by genre as well. For example, if a user likes show tunes, but not all show tunes, the user may create a summary music identification value just on the showtunes (or a subset of the showtunes) in the user's personal content library. Thus, a genre based summary music identification value for that user will be more personalized. Similarly, if a user likes a certain kind of jazz, a personalized genre summary music identification value can be generated and used in the system.

The summary music identification value can also be generated by other means, such as question and answers, checking off boxes, or by rating content experiences on a scale. The scale could range from simple "like/dislike" to a range based scale (e.g. a 1-10 scale, a five point scale, or any other type of ranged scale).

The summary music identification value may be static over time or it may be continuously updated based on content selected by the user.

In another embodiment, the summary music identification value may be based on activity and/or the time of day and/or day of the week. The user may desire certain types of songs regardless of genre depending on the time of day or activity. For example, a user may want high energy content for workouts, more wakeup kind of music for morning commute, or more soothing music during dinner.

Figure 2:
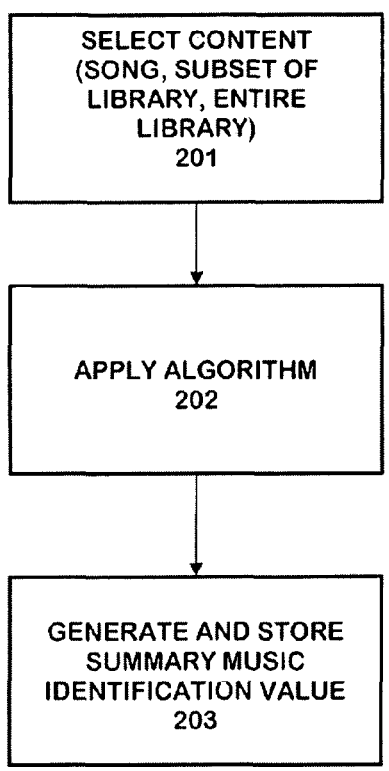
FIG. 2 is a flow diagram illustrating a technique for generating a summary music identification value using selected content.

FIG. 2 is a flow diagram illustrating a technique for generating a summary music identification value using selected content. At step 201 the user selects content on which to base the summary music identification value. This may consist of a single song or artist, a plurality of songs that the user identifies, a subset of the user's local content library, or the entire content library of the user.

At step 202 an algorithm is applied to extract the summary music identification value. As noted above, this algorithm may be that described above as "MusicIP", the Pandora approach, the Gracenote Musical ID and microgenre system, or any other suitable system, presently known or later created, for defining a summary music identification value.

At step 203 the summary music identification value is generated using the selected algorithm and stored.

Another way of obtaining a summary music identification value is to copy or purchase one from a third party. For example, if a friend has a summary music identification value that a user likes, the friend's summary music identification value can be copied and used as desired. In addition, there may be a market for celebrity driven summary music identification value(s). Just as now there is a market for CD's or other small collections of an artist's favorite songs, a celebrity or artist may generate a summary music identification value representing that artist's musical tastes. This celebrity summary music identification value could be downloaded from a website or otherwise purchased or obtained.

The generation of the summary music identification value may be generated in a number of environments. For example, the summary music identification value may be generated out of the vehicle, such as at a personal computer at work or home, or even in a commercial environment where summary music identification value(s) are generated. Alternatively, the summary music identification value may be generated on the fly in the vehicle itself, even from the selection of a single song.

Figure 3:
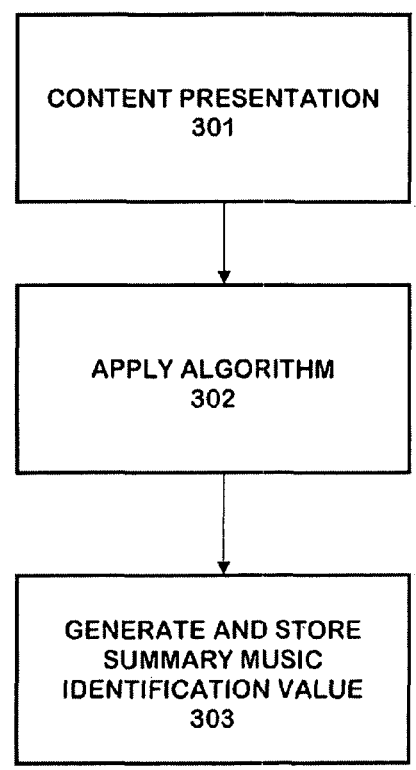
FIG. 3 is a flow diagram illustrating a technique for generating a summary music identification value from presented content.

FIG. 3 is a flow diagram illustrating a technique for generating a summary music identification value from presented content. At step 301 content (i.e. a song) is being presented. At step 302, at the instigation of the user, a summary music identification value algorithm is applied using the presented song as the data source. At step 302, the summary music identification value is generated and stored. As will be described below, in one embodiment the system can be configured to automatically continue with the automatic generation and presentation of a playlist when the on the fly option is invoked, so that the user is able to take advantage of the system with minimal involvement.

Although one embodiment of the system is based on the use of a summary music identification value, the system has equal applicability to the manual generation of playlists of content created by a user. The system can be used to allow easy remote and local access to those playlists such as by voice command.

Personalized Radio Station

Once one or more musical signatures are obtained, regardless of how they are generated, they are stored in memory that can be used in the vehicle infotainment system. For example, it may be something as simple as a memory device that is readable by the vehicle base system. In other cases, it can be a more sophisticated component that is capable of independent playback and other features or may be combined with the vehicle base system for a richer experience.

The summary music identification value then becomes the base value for the creation of a personalized streamed radio station.

In one embodiment, the procedure would be as follows:

1. Create summary music identification values via any of the methods listed above and 2. Store this value and either in volatile (immediate use case) or non-volatile memory (future use case) then 3. Use this value to generate a custom playlist based on the summary music identification value.

One method of generating the playlist is to access locally stored content, such as data storage of mp3s or other digitally stored content, select any seed (seed content is any song where the music identification value has or will be defined and can be used as the basis for a playlist or seed songs where in the process of selecting more than one song a average musical value is calculated with the result of this calculation being used as the seed for a playlist (this average value could also be stored independently) content and begin playing the content where after which a playlist will be delivered (in this embodiment the seed song is included in the generated playlist. It is also possible to use song(s) to generate playlists and not include the "seed" songs.

Another technique is to access via internet to off board content/service provider or server who will then aggregate a playlist "Internet Radio Channel" based off this music identification value and stream the content back to your playback device. (Note, this step could be performed in two methods; initiated by the user in the car when the listening begins where this music identification value is exchanged from the vehicle to the off board content/service provider/server or in advance remotely via a similar music identification value exchange (Via PC) and made available for streaming to the vehicle at a later time.)

Another technique is to host a personal music library remotely and gain access via the internet. In this case all the music identification summary value functionality remains but there is no direct service provider other than a remote storage facility.

When the user is in the vehicle, the user selects from the one or more music identification values (seed song) or average values (seed songs) and the vehicle system seeks out content and content sources (i.e. internet radio) to provide/return custom content that has a relationship either inside or outside of some predetermined deviation/boundary to the selected music identification value (seed song) or average music identification value (seed songs) of the user and this deviation/boundary can be controlled/varied by a steering algorithm. This content aggregation is accomplished by an algorithm either run locally or remotely that compares the local summary music identification value to the available remote content with associated summary music identification values and metadata and selectively providing return streamed or data content that falls within predetermined limits of the steering algorithm.

Figure 4:
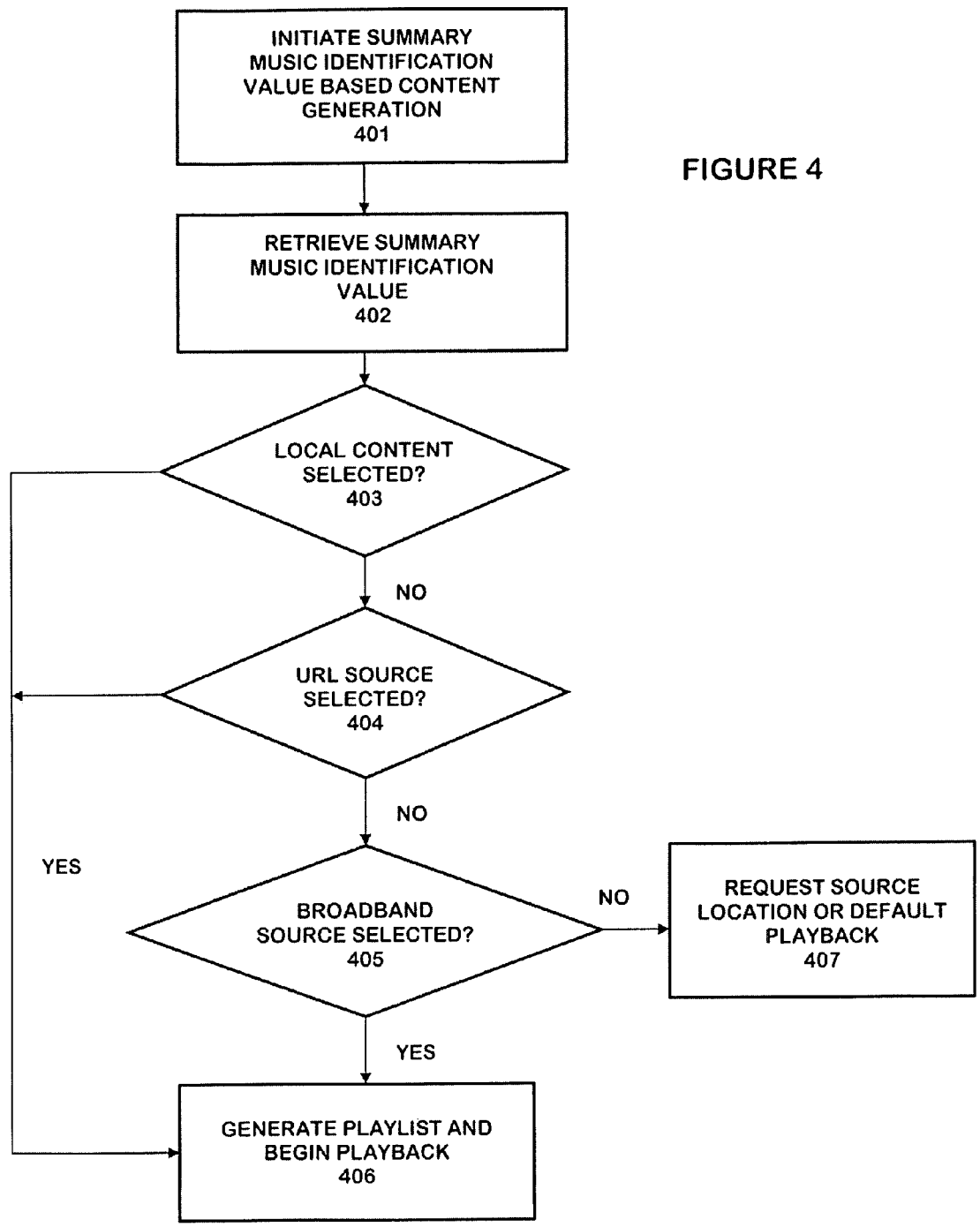
FIG. 4 is a flow diagram illustrating a technique for presenting content using a selected summary music identification value.

FIG. 4 is a flow diagram illustrating a technique for presenting content using a selected summary music identification value. At step 401 the summary music identification value based content generation system is initiated. This may be via voice command, manual command, or any other suitable means of initiating the system. It could be via remote control using a PCD or by manual interaction with the base unit. In another embodiment it may be initiated automatically be a PCD, smartphone, external mass storage, external smart mass storage, PDA, UMPC or vehicle key coded to a specific user, such that whenever that user is in the car, the summary music identification value(s) for that user is retrieved and used automatically. At step 402 the summary music identification value is retrieved. This may be a single summary music identification value that the user has created or obtained. It may also be selected by the user from a list of one or more summary music identification values available to the user. Some or all of these may be statically stored and made available through a menu or other selection process. In other instances, the choices may consist of statically stored and/or dynamically presented summary music identification value(s), such as from a third party or other resource.

The next steps are used to determine the source of the content to be used with the summary music identification value to generate a playlist. At step 403 it is determined if the source of content is to be locally stored content, such as digital files in a CD carousel, digital files on a local mass storage device, mp3 player, or the like. If so, the system proceeds to step 406.

If local content is not to be used, the system checks at step 404 if a URL source has been selected. If so, the system proceeds to step 406. When a URL is defined, this could be a home computer of the user where the user has stored accessible or streamable or otherwise transferable content. The selected summary music identification value is used as a filter or "seed" to select or create a playlist consisting of content that falls inside or outside of the boundaries defined by the steering algorithm based on the characteristics of the music identification value. The playlist is then streamed or transferred in data from to the user via broadband wireless access.

This wireless transmission is not restricted to any particular protocol. The system can use HTTP, Bit Torrent, or any present or future transfer methodology for data delivery.

At step 405 it is determined if a broadband source is selected. If so, the system proceeds to step 406. This could be an internet radio station or other network resource that is capable of providing content based on selection criteria, such as via a summary music identification value. The content is transmitted to the vehicle wirelessly via streaming or any other suitable means. If no detectable source is selected, the system proceeds to step 407 and requests a source location from the user or goes into a default playback mode.

Although the system is described as assembling content from a network based source such as the Internet, it may also be implemented in a system where it assembles content stored locally, such as a digital library of songs assembled by the vehicle user and stored in mass storage in the vehicle. In other embodiments, it can be a combination of stored content and network content.

The user can in one embodiment program a PCD so that it is aware of the time of day and can automatically select a stored summary music identification value as desired by the user (e.g. morning drive time). The user can easily change content by simply selecting another summary music identification value as desired. This leaves the user (typically the driver) free to concentrate on operating the vehicle instead of on operating the infotainment system.

Figure 5:
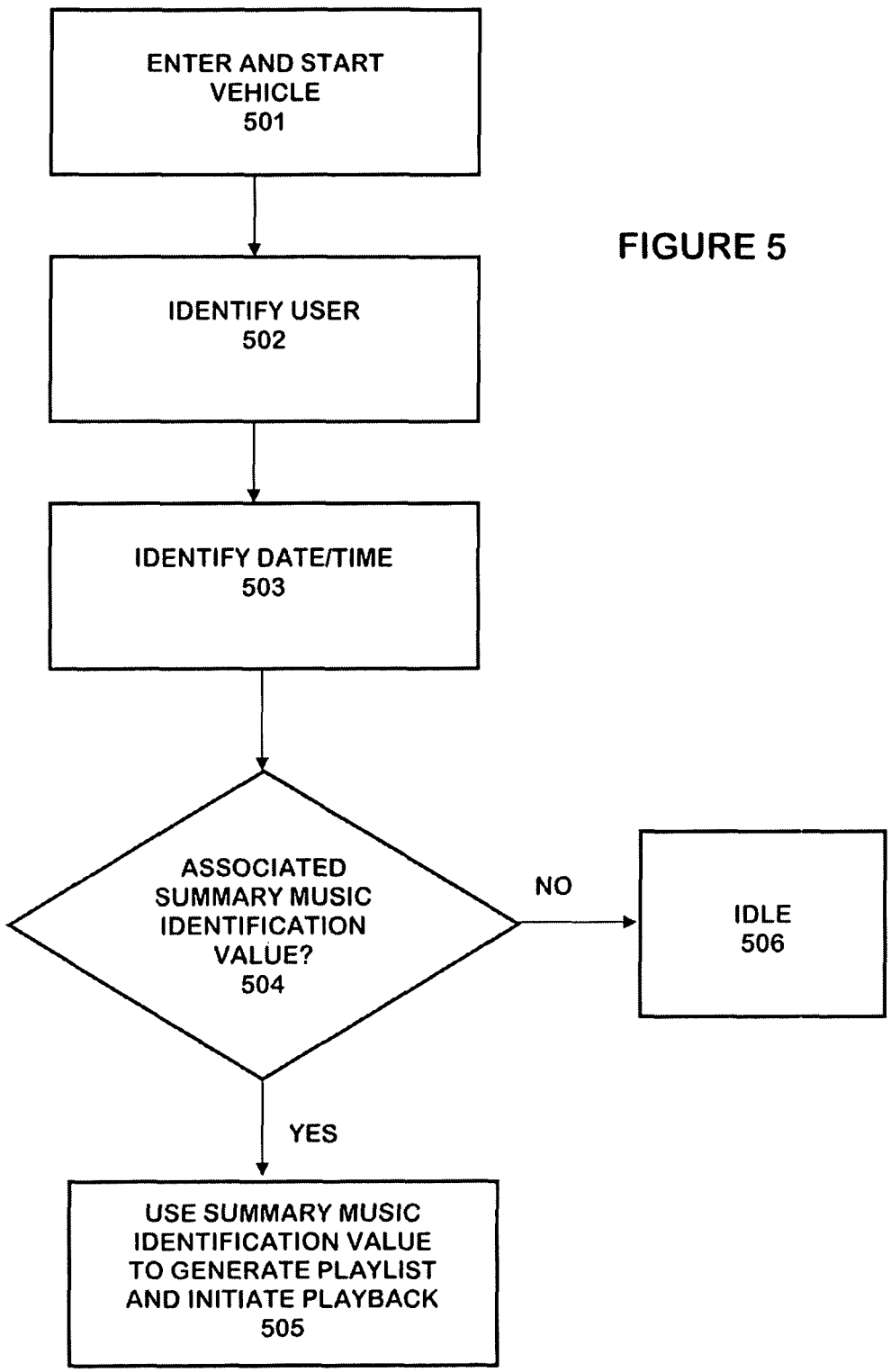
FIG. 5 is a flow diagram illustrating a technique for presenting content automatically using a summary music identification value.

FIG. 5 is a flow diagram illustrating a technique for presenting content automatically using a summary music identification value. At step 501, the user enters and starts the vehicle. At step 502, the system identifies the user. This can be accomplished by known systems that match settings in the vehicle with a vehicle key, or may be by some other means such as the user's PCD broadcasting an identification code to the base unit of the system. At step 503 the system determines the date and time of day.

At decision block 504, the system searches its memory to see if there is a summary music identification value for this user associated with the current day of the week and/or time of day. If so, the system retrieves the summary music identification value at step 505 and uses it to generate a playlist and begin feedback. If there is not associated summary music identification value, the system idles at step 506. At this point, the system could be invoked in some other manner, such as is described in connection with the operation described in FIG. 4.

Voice Controlled Environment

In a vehicle environment, it may be useful to utilize voice commands as much as possible to reduce the manipulation of instruments other than those needed for safe driving. Therefore the system contemplates being controlled by voice command. In any of the embodiments described above, all actions and choices may be initiated or provided via voice command or audio playback. This frees the driver from the need to manually access the system.

Figure 6:
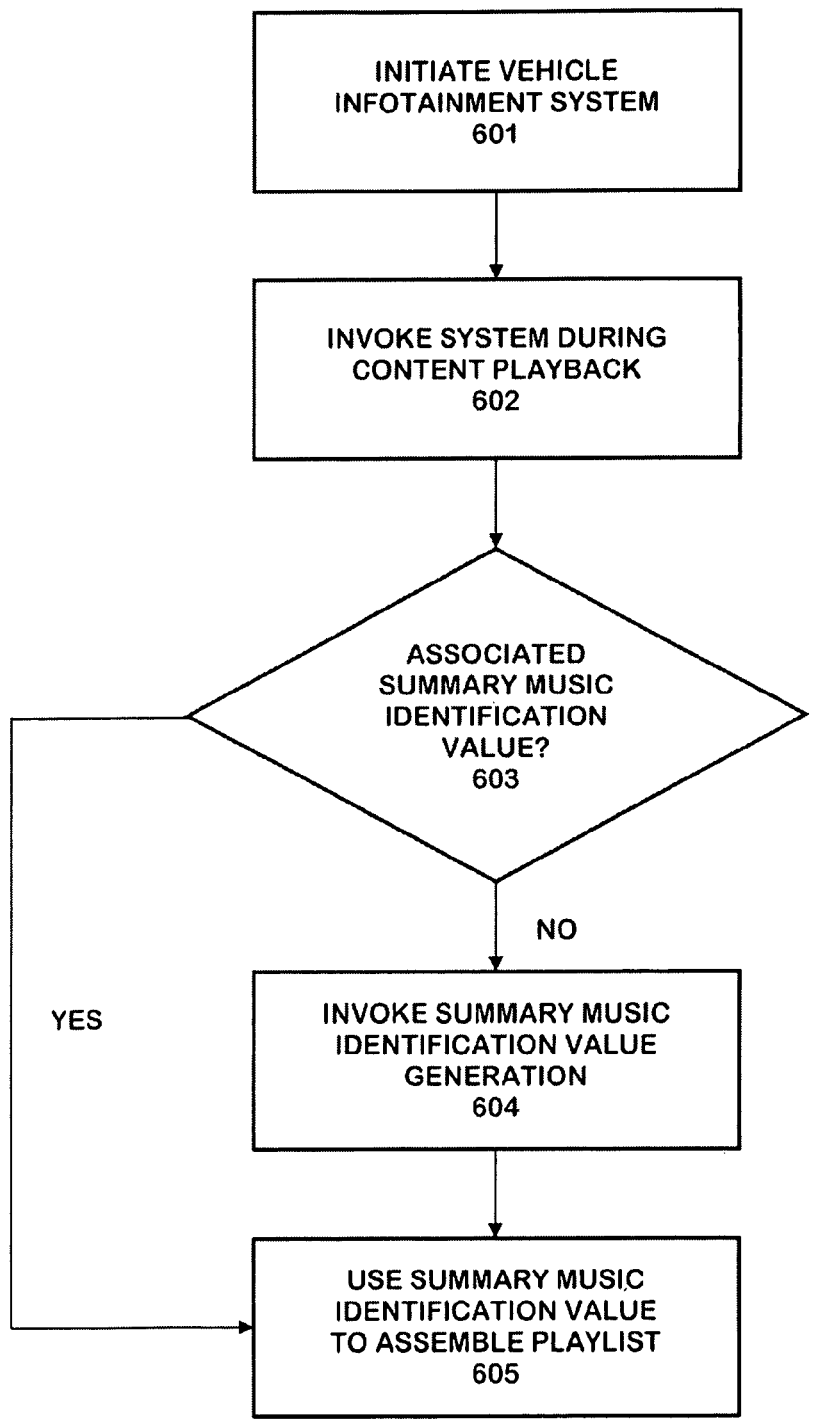
FIG. 6 is a flow diagram illustrating a technique for invoking the system during playback of content.

In addition to the systems described above, there is an embodiment where the summary music identification value system may be invoked on the fly or during traditional playback of content. This embodiment is described in the flow diagram of FIG. 6. At step 601 the user initiates the vehicle infotainment system and playback of content begins. This may be traditional playback of content via CDs, radio, mp3s or any other type of content playback. It may even be as a result of invoking the system as described in any of the embodiments above.

At step 602 the user is listening to playback. If the user hears content (e.g. a song) and desires to hear more content like the one being played back, the user invokes the summary music identification value system. This may be done via voice command, by manual selection, or by some other suitable means.

At decision block 603, it is determined if there is a summary music identification value associated with that content. This can be done via a user associated database of content and the user's summary music identification value or summary music identification values. That database may be stored locally in the vehicle or accessed via wireless broadband. If there is an associated summary music identification value, the system uses it at step 605 to assemble a playlist and the playlist is played back at step 607.

If there is no summary music identification value at decision block 603, the system invokes a summary music identification value generation step at step 604. Using any of the techniques described above for generating a summary music identification value, the system does so and uses the newly generated summary music identification value at step 606 to assemble a playlist. Playback of the assembled playlist is begun at step 607.

Figure 9:
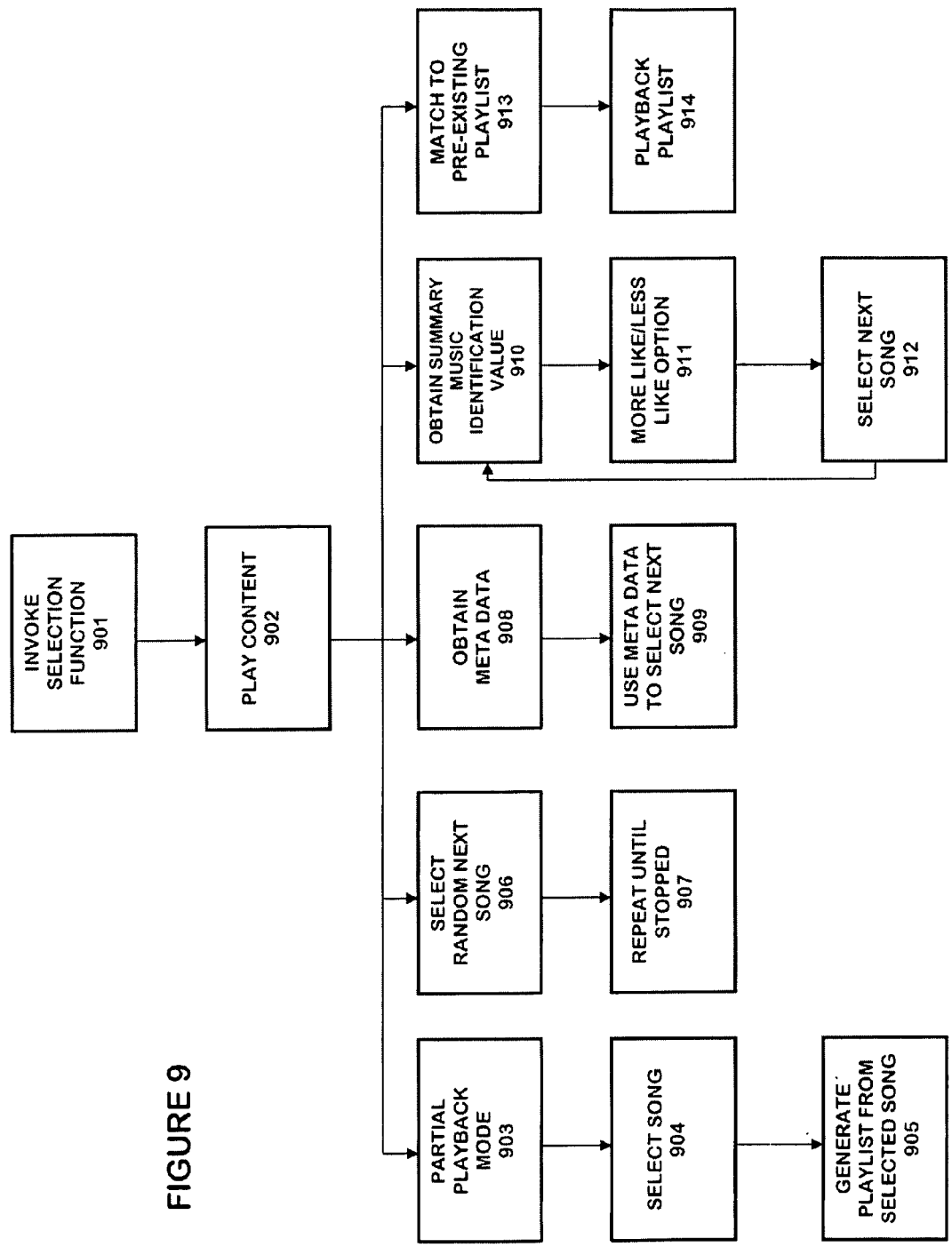
FIG. 9 is a flow diagram illustrating a technique for controlling the system using a number of interfaces.

FIG. 9 is a flow diagram illustrating a technique for controlling the system using a number of interfaces. At step 901 the user invokes a selection function of this embodiment. The selection function 901 is described in more detail in FIG. 10. At step 902 content begins to be played back. This could be content that is selected by the user while in this mode, or the content could already be playing when the user invokes this mode. At this point there are a number of branches that the system could take either during or immediately following playback of the selected song. The path to be followed could be the result of a default setting preselected by the user when the mode is invoked, or could be invoked at the time the mode is selected. The invocation of this mode may be by voice command such as select artist, title, album, genre or a combination thereof, selection switch or button, or any other suitable method or means of invoking a mode. In one embodiment, some paths may or may not be available depending on how the user invokes the selection function. If manual mode is used, more paths might be available because more directional control may be available in manual mode. In voice command mode, fewer paths might be available because of a limitation in presenting options to a user in voice command mode.

A first branch begins partial playback of the song (e.g. 5 seconds of playback) and then proceeds to a next song for partial playback at step 903. This continues with partial playback of songs until the user selects a song at step 904. Again, this may be accomplished via voice command or manual invocation. The system then plays the selected song in its entirety. After playback of the selected song, the system can return to the partial playback mode and play portions of songs until the user selects another one for full playback. In one embodiment, at step 905, a playlist is generated based on the selected song so that after full playback of the selected song, other songs are presented in full to the user pursuant to the generated playlist. The playlist may be generated by any of the other branches of FIG. 9, or by any of the methods for generating a playlist described herein.

The second branch at step 906 allows the content of step 902 to be played in full and then randomly selects a next song at step 906. This process of random selection of a follow up song repeats at step 907 until the user stops this mode. The user may elect to stop playback entirely or invoke any of the branches at any time.

The third branch involves obtaining meta data of the currently playing song at step 908. The meta data is used to select a next song for playback at step 909. This process repeats until stopped or changed by the user.

At step 910 of the fourth branch, a summary music identification value is generated. This value is used to generate a playlist as noted above. In one embodiment, the user is presented with an option, which may be displayed or spoken, such as "more like this" or "less like this" at step 911. This is a steering algorithm to modify the playlist generation of the system. It may also be invoked via voice command by the user. Based on the steering of the user at step 911, a next song is selected at step 912 and the system repeats the steps of 910-912 until stopped by the user.

The fifth branch searches at step 913 to determine if the currently playing song is already associated with a pre-existing playlist. If so, the system presents the next songs of the playlist at step 914.

Selection Function

Figure 10:
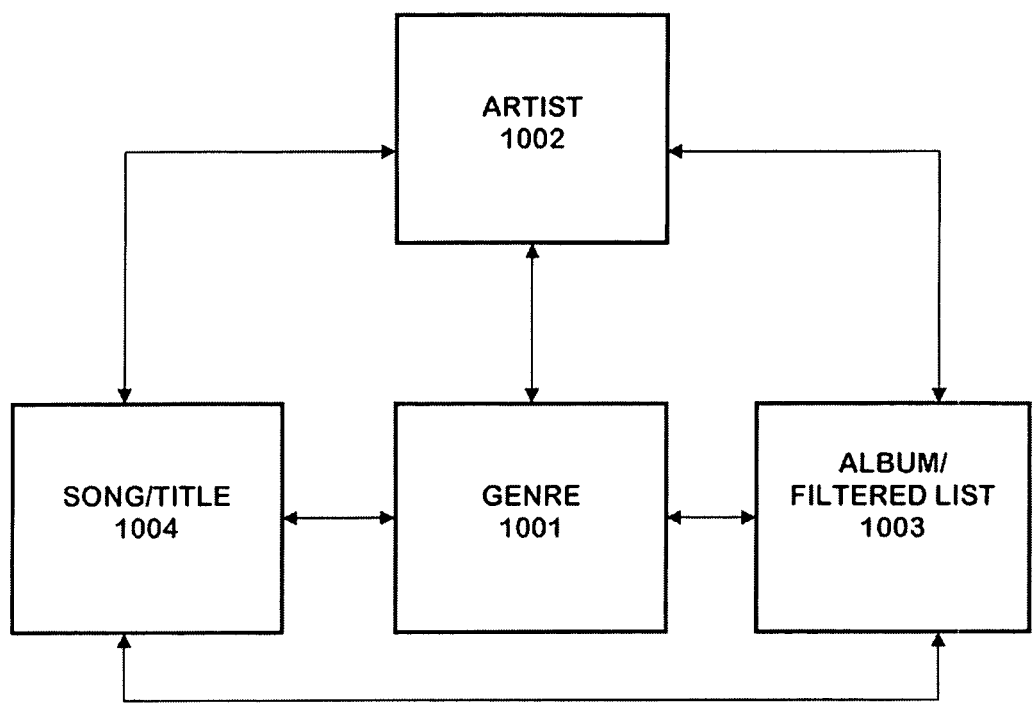
FIG. 10 is a flow diagram illustrating a technique for moving up and down through control menus of the system.

FIG. 10 is a flow diagram illustrating the operation of an implementation of the selection function of step 901 of FIG. 9. The user can initiate the selection system at any point such as, for example, by starting at Genre 1001. The user can then move to Artist 1002, to Album/Filtered List 1003 and then to Song/Title 1004. As can be seen by the orientation of the selections and the two way arrows joining the selections, the user is free to move up and down the selections at will. In addition, the user can enter the selections at any point and move to any of the other selection points from each location. This makes it easy for traversing the large selection of content available using the system.

Depending on where the user enters the system or in which location the user is presently, different options are presented and available in the other options. For example, if following the Genre path the user will have more Artists available than if using the Song/Title path. Going up or down the path can increase options accordingly.

When the user selects at a level above the Song/Title level, there automatically exists other songs and content to play after finish of the current selection. At any time the dynamic playlist options may be invoked using the system. The system can be invoked manually or by speaking the name of the selection location desired (e.g. "Genre" or "Artist").

It should be noted that the activation and setup of the system can be accomplished off board (e.g. separately from the car) such as at a user's PC, a portal, or an internet service provider. The initiated and activated system could then be transferred to the user's vehicle and presented to the user as channels in the traditional sense. It should also be noted that the system could be transferred into more than one vehicle or could be moved from vehicle to vehicle as desired. Further, the transportable system is not limited to a vehicle based system but could be implemented in any portable playback device.

Filtered Operation

In one embodiment, the system includes a method of filtering or restricting the available library content to be presented to the user. For example, the user may want to limit the available library to content that the user has already listened to, or has listened to at least a certain number of times. Some playback systems automatically assign a degree of "favourite" status to content based on the number of times it has been selected for playback (e.g. 1-5 stars). The user may also have a hierarchy of databases and the system could be set up to only present content from one of the databases or libraries at a time. One method of distinguishing sources is to have a priority for locally stored content versus content that requires streaming or downloading.

If the user is in the "more like this/less like this" mode, for example, the offered selections may be restricted from a certain database or a certain category of favourite status of the content. If other content is to be included, it may be desired to limit the amount or percentage of new content that is offered. For example, it may be desired to limit new content to 5% of the presently available content. This percentage could easily be modified as desired.

Command Trees and Intelligent Scanning

FIGS. 11-16 are flow diagrams illustrating a number of command scenarios using the system. These command trees may be used in a voice controlled system, for example. FIG. 11 is a flow diagram illustrating the selection of content by specifying an artist. At step 1101 the user issues the command "Select Artist" and provides the name of an artist. At step 1102 the matching artist is displayed or otherwise indicated to the user. At this point the user can command all songs of the artist (step 1103) or all albums of the artist (step 1105). If all songs by the artist is selected at step 1103, then a selected song or all songs of the artist are presented for playback at step 1104. If all albums by the artist is selected at step 1105, then a selected album or all albums of the artist are presented for playback at step 1106. In this command tree scenario, a playlist consisting of all of the artists songs or all of the artists albums is provided for playback, so that the user does not need to further interact with the system to receive additional content playback.

FIG. 12 is a flow diagram illustrating the selection of content by specifying a song title. At step 1201 the user issues a command "Select Song Title" and names a song title. At step 1202 the matching song title is displayed or otherwise indicated to the user. At step 1203 the user selects an artist in those cases where more than one artist has a song with the same title or versions of the same song. When this command is used and only a single song is selected, there is no playlist necessarily associated with the song selected. In those cases, the user may need to continually select single songs after each one has played, or may initiate one of the playlist generating techniques described above.

FIG. 13 is a flow diagram illustrating the selection of content by specifying an album. At step 1301 the user issues a command "Select Album" and names an album. At step 1302 the matching album is displayed or otherwise indicated to the user. At step 1303 the user elects playback of the album or at step 1304 selects a song from the album. If the playback of the album is selected at step 1303, the system uses the album as a playlist so that more content can be immediately provided after each song without interaction by the user. If the user selects a single title at step 1304, the system may play the remaining songs of the album, may require additional interaction from the user to select new content, or can use of the playlist generating techniques described above.

Figure 14:
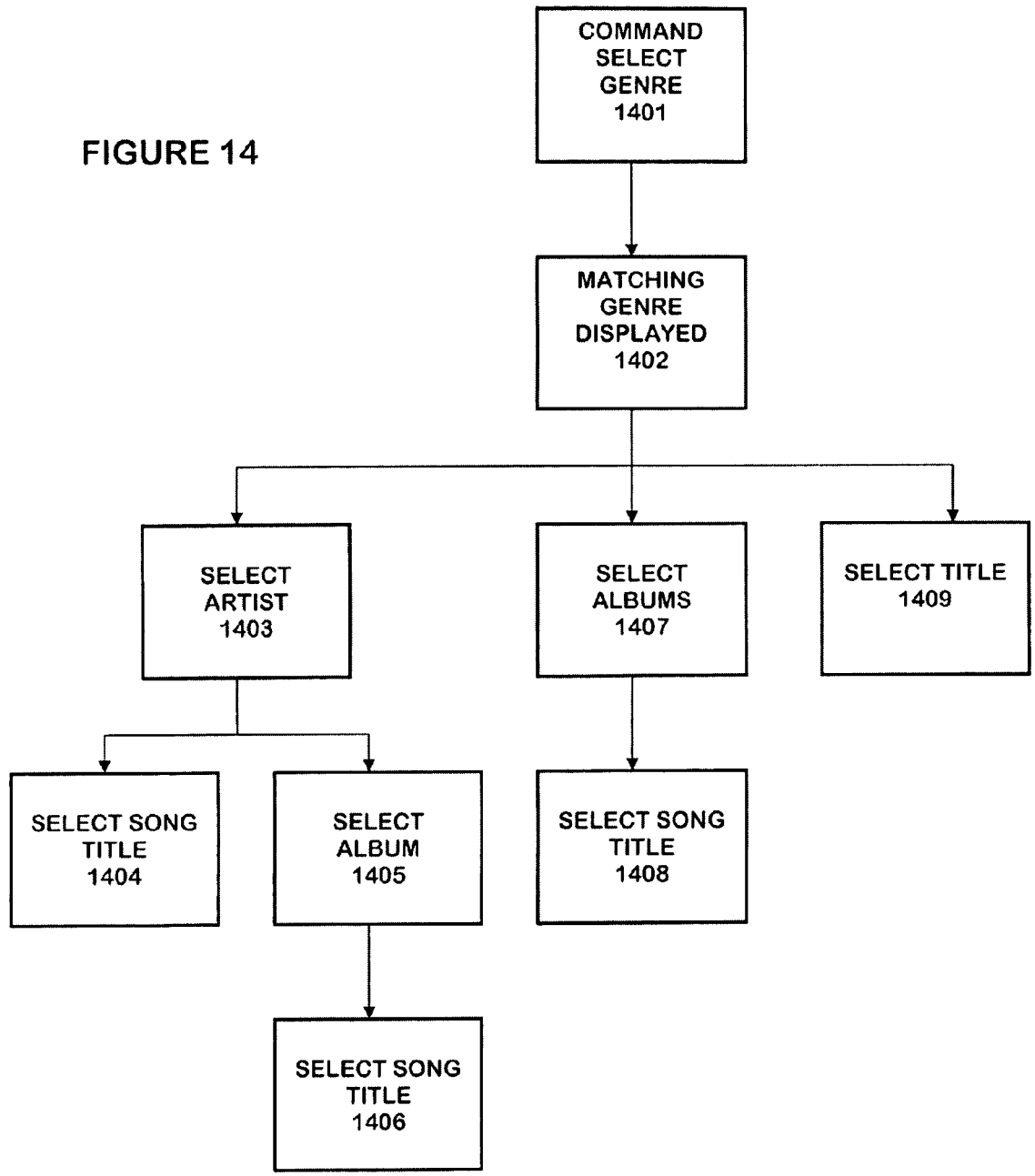
FIG. 14 is a flow diagram illustrating the selection of content by specifying a genre.

FIG. 14 is a flow diagram illustrating the selection of content by specifying a genre. At step 1401 the user issues a command to "Select Genre" and identifies a genre. At step 1402 the matching genre is displayed or otherwise indicated to the user. At this point the user can select one of three branches similar to those described in FIGS. 11-13. At step 1403 the user can select an artist from the genre. The user can then select a song title at step 1404 or select an album of the artist at step 1405. If an album is selected, the user may select a song title from the album.

At step 1407 the user can select an album from the presented genre. The user may then elect to select a song title from the album at step 1408. At step 1409 the user can select a song title from the genre.

Figure 15:
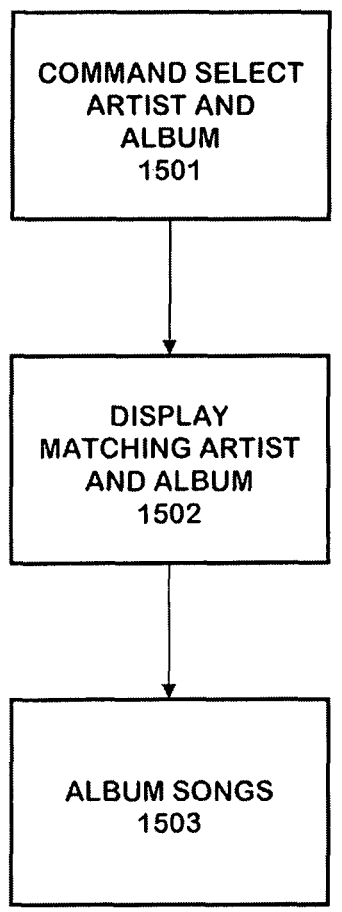
FIG. 15 is a flow diagram illustrating a compound command of selecting an artist and an album.

FIG. 15 is a flow diagram illustrating a compound command of selecting an artist and an album. At step 1501 the user issues a command to "Select Artist and Album" and identifies an artist and album of that artists. At step 1502 the matching artist and album is displayed or otherwise indicated to the user. At step 1503 the album songs are played back to the user. This command will yield a subset of songs (the album) as a playlist for presentation to the user. Afterwards the user can use any of the available commands to initiate content, including the commands described herein and the generation of a playlist by the techniques described above.

Figure 16:
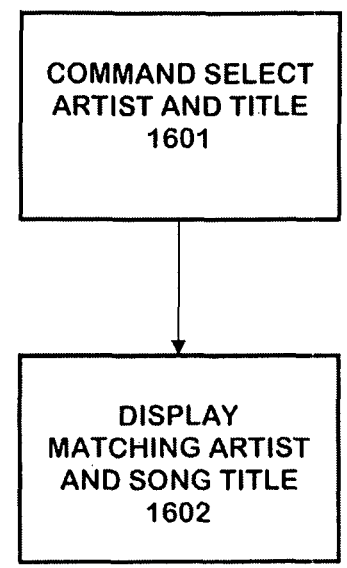
FIG. 16 is a flow diagram illustrating a compound command for the selection of content using artist and song title.

FIG. 16 is a flow diagram illustrating a compound command for the selection of content using artist and song title. At step 1601 the user issues a command to "Select Artist and Song Title" and names an artist and a song of the artist. At step 1602 the matching song is displayed or otherwise indicated to the user and is played back. The user can then select another song for playback using any of the commands or by generating a playlist using any of the techniques described above.

When the user has used one of the commands to drill deeply into the database, (e.g. when a single song has been selected), the system anticipates a number of options for providing new content without requiring significant interaction with the system by the user. For example, the single and compound commands described in FIGS. 11-16 whether by voice command or simple manual commands, can be used to get to a new song.

In another approach, the branches of FIG. 9 can be used to generate the next song. Any of these branches may be a default mode for the system if desired. Alternatively, the user can select one of the branches by a voice or manual command.

Although the system has been described in connection with audio output and songs, it should be noted that it has equal application to any definable content, including visual, textual, spoken, and the like. In addition, the user may be presented with non-textual methods of selecting content, such as images of album covers or artists, or other graphical representations.

Embodiment of Infotainment System for Use with Personalized Content System

An infotainment system according to the system may comprise a single unit configured with access to storage and/or to a network such as the Internet. In one embodiment the system comprises a first processing unit and a second processing unit.

First Processing Unit

Figure 7:
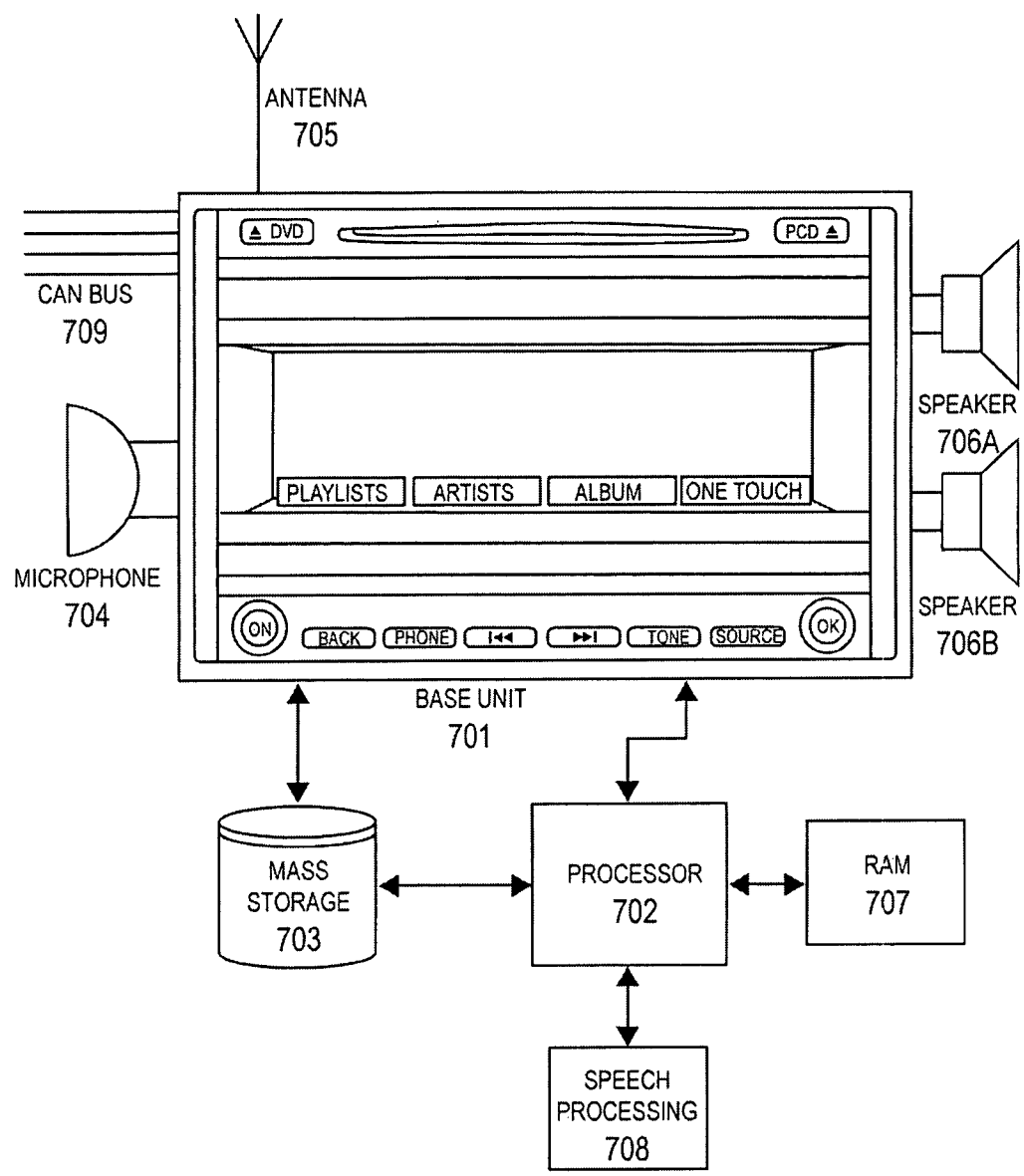
FIG. 7 is a block diagram illustrating a base unit of the system.

The first processing unit is illustrated in FIG. 7. The first processing unit is typically intended to be firmly mounted to the vehicle and to remain with the vehicle for most of the vehicle's life.

Referring to FIG. 7, the first processing unit comprises a base unit 701 that represents the visible portion of the unit, including a display and a plurality of input and activation buttons and switches. In one embodiment the base unit includes a touch screen for additional input capability, as well as providing appropriate display capability.

The base unit may be connected to a vehicle data output source such as via vehicle bus 709. The vehicle data output may provide a signal via bus 709 corresponding to any status of the vehicle, the vehicle surroundings, or the output of any other information source connected to the vehicle. Vehicle data outputs include, without limitation, analog signals (such as current velocity), digital signals provided by individual information sources (such as clocks, thermometers, location sensors such as Global Positioning System sensors), digital signals such as vehicle data networks (such as the engine CAN bus through which engine related information is communicated, the comfort CAN bus through which comfort related information is communicated, and a multimedia data network like the MOST bus through which multimedia data is communicated between multimedia components in the vehicle) The base unit 701 may retrieve from the engine CAN bus 709 for example the current speed of the vehicle from the wheel sensors. Another example for a vehicle data network is the comfort CAN bus that is used to communicate commands and certain status information between comfort related components of the vehicle. In addition, other schemes such as Ethernet can be used as well without departing from the spirit and scope of the system.

The base unit 701 in one embodiment includes antenna 705. Antenna 705 is shown as a single antenna, but may comprise one or more antennas as necessary or desired. The base unit 701 may obtain broadband wireless internet access via antenna 705. The base unit 701 can receive broadcast signals such as radio, television, weather, traffic, and the like. The base unit 701 can also receive positioning signals such as GPS signals via one or more antennas 705. The base unit 701 can also receive wireless commands via RF such as via antenna 705 or via infrared or other means through appropriate receiving devices.

Output

The base unit 701 unit may be connected to one or more visual display devices such as a central display located in the center of the dashboard and visible for the driver as well as for the passengers, a driver display located conveniently for the driver to read out driving related information, a head-up display for displaying information on the wind shield, a rear seat display visible for the passengers sitting on a rear passenger seat, a co-driver display mainly visible for the co-driver, and the like. The base unit 701, however, does not have to be connected to a visual display device. In this case it may be adapted for displaying visual information on a visual display connected to the second processing unit in case a second processing is attached to it. The connection of the second processing device to the visual display device may be analog, digital, or any combination thereof.

The base unit 701 may be connected to one or more acoustic reproduction devices such as a typical vehicle audio system including electromagnetic transducers such as speakers 706A and 706B. The vehicle audio system may be passive or, more preferably, active such as by including a power amplifier. The base unit 701 may be the only audio source for the acoustic reproduction device or there may be other audio sources that are connected to the audio reproduction system. The connection of the second processing device to the audio reproduction device maybe analog, digital, or any combination thereof.

The base unit 701 includes processor 702 for executing programs and controlling input/output, display, playback, and other operations of the base unit 701. Mass storage 703 is included in one embodiment for storing data in non-volatile form. The processor 702 includes associated RAM 707 and speech processing unit 708. A microphone 704 is coupled to the base unit 701 to receive voice commands from a user.

As noted, in one embodiment the system operates with only a base unit.

Second Processing Unit

The second processing unit is intended for more regular replacement (for example if more powerful technology is available) than the base unit 701 and thus is detachably connected to the base unit 701.

Detachable Connection

Figure 8:
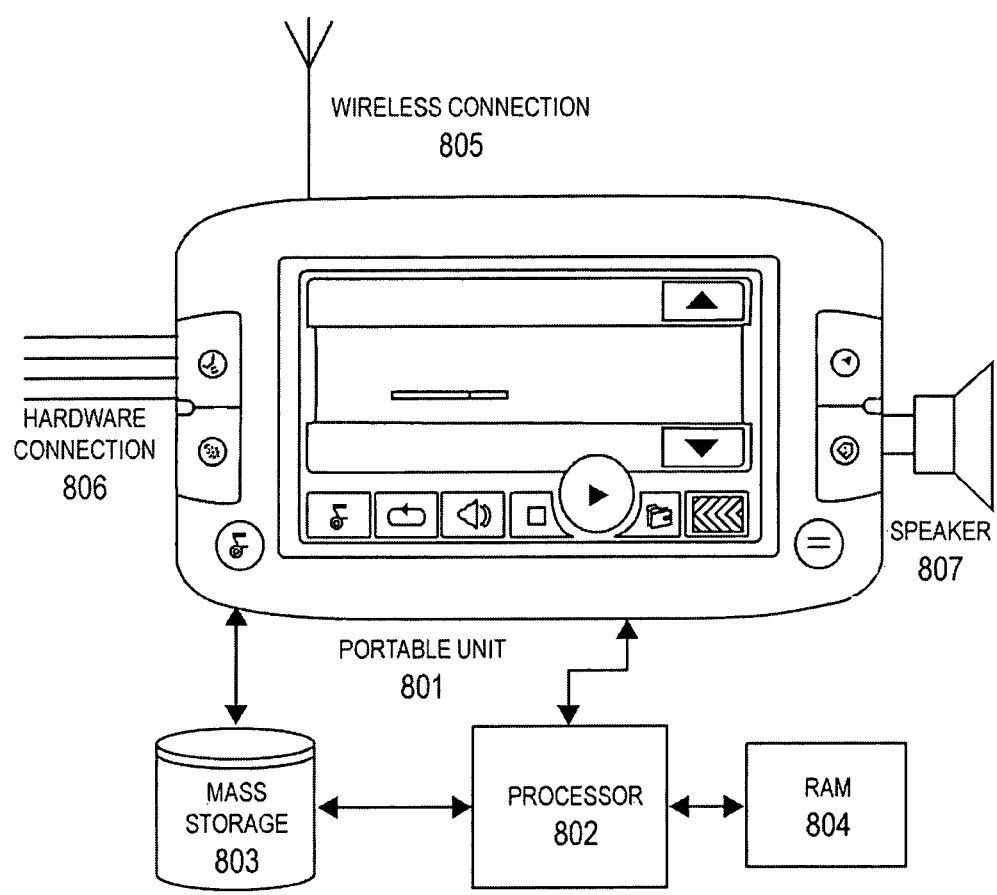
FIG. 8 is a block diagram illustrating a transportable unit of the system.

The system comprises a second processing unit illustrated in FIG. 8 and comprising portable unit 801 that is detachably connected to the base unit 701, such as via a hardwire connection 806 or wireless connection 805. The detachable connection includes one or more of the following connections: Analog electric connection, serial digital connection (unidirectional or bidirectional), parallel digital connection (unidirectional or bidirectional) represented symbolically by hardwired connection 806, and wireless digital connection represented symbolically by wireless connection 805 comprising infrared, radio frequency, Bluetooth, ultrasonic, and the like; either of the foregoing unidirectional or bidirectional. The portable unit 801 also includes power supply (not shown), display (which may be touch screen), input buttons and switches, non-volatile storage 803, RAM 804, and processor 802.

Input

The portable unit 801 may receive input signals relating to any status of the vehicle, the vehicle surroundings, or the output of any other information source connected to the vehicle through its connections to the base unit 701 which receives and transmits such information.

Alternatively, the portable unit 801 may be connected directly to a vehicle data output or a vehicle data network in analogy to the base unit 701 as described above.

Output

The portable unit 801 may be connected to one or more visual output devices. In many cases, the visual output device to which the portable unit 801 is connected is mounted together with the portable unit 801 into the same housing. In these cases, the visual output device is intended to be used when the portable unit 801 is operated independently of the vehicle and the base unit 701 as well as when the portable unit 801 is used in the vehicle in which case the visual output device connected to the portable unit 801 may be used in addition to or as a replacement for the visual output device connected to the base unit 701 or may even be switched off. Visual output devices useful in the context of the system include liquid crystal displays, TFT displays, LED (Light Emitting Diode) displays, organic LED displays, projectors, head-up displays, and the like.

The portable unit 801 may be connected to at least one acoustic output device such as speaker 807. In many cases, the acoustic output device to which the portable unit 801 is connected is mounted together with the second processing device into the same housing. In these cases, the acoustic output device is intended to reproduce the acoustic output stream generated by the portable unit 801 when used independently of a base unit 701. Acoustic output devices useful in the context of the system include, without limitation, loudspeakers, headphones, whether being connected to the portable unit 801 by wire or wireless.

Mass Data Storage

A mass data storage device such as a optical media drives (including CD, DVD, blue ray DVD, and the like), hard disks, flash memory, memory sticks, or the like may be connected to the first processing device, to the second processing device or to both (examples are mass storage 803 of portable unit 801 and mass storage 703 of base unit 701). Mass data storage devices allow for the non-volatile storage of large amounts of data such as video and audio data, digital map data, operating software that can be readily retrieved by the first or second processing devices. Once the second processing device is connected to the first processing device, either processing unit may make accessible the data stored on its respective mass data storage to the other processing unit. The mass data storage devices may be firmly integrated into the processing unit (such as an integral hard disk or an integral optical media drive) or may be detachably connected to the processing unit (such as a memory stick being connected via a USB connection) adapted for hot or cold swapping of the mass data storage devices.

Modes of Operation

As long as the portable unit 801 of the infotainment system of the system is detached from the base unit 701, the system software which is controlling many of the essential functions of the infotainment system is running entirely on the base unit 701.

The portable unit 801, when detached from the base unit 701 of the system, may run its own system software rendering the portable unit 801 useful as a stand-alone unit. In this case, the necessary input and output devices, such as data entry devices, vehicle data outputs, or vehicle data networked must be connected directly to the portable unit 801.

As soon as the portable unit 801 is connected, both processing units detect that the connection has been establish and adapt their behavior accordingly.

In a first mode of operation, the main system software of the infotainment system is now executed on the portable unit 801. The base unit 701 now redirects all or part of the input it receives to the portable unit 801 for further processing. The base unit 701 pre-processes all or some of the input before the input is transmitted to the portable unit 801. The system software running on the portable unit 801 generates an output signal that is transmitted to either directly to output devices directly connected to the portable unit 801s or to the base unit 701 which transmits the output signal to output devices connected to it. The base unit 701 may or may not process the output signal before transmitting to the output devices connected to it.

EXAMPLES

Embodiment 1

Vehicle is equipped with a base unit 701, a visual display, and an acoustical reproduction system all of which are firmly mounted into the vehicle. The user may at a later time purchase a portable unit 801 that is attached into a mechanical holding device including the electrical connection to the first processing device. The holding device is located for example in the trunk of the car. Once the portable unit 801 is installed the base unit 701 switches its mode of operation to (i) receiving the visual output stream from the portable unit 801 and displaying the visual output stream on the visual display firmly mounted into the vehicle and (ii) receiving an audio control signal from the portable unit 801 (iii) receiving an audio output stream from the portable unit 801 and mixing it with audio sources connected to the base unit 701 in accordance with the audio control signal received from the base unit 701.

Embodiment 2

Like Embodiment 1 but the portable unit 801 generates a visual output stream and a video control signal. The base unit 701 mixes the video output stream received from the portable unit 801 with the video signal received from video sources connected to the first processing device.

Embodiment 3

Like Embodiment 1 or 2 but the second processing device sends digitally encoded display instructions to first processing device (instead of video output stream).

Embodiment 4

The visual output device is connected to the second processing device and may be replaced easily by the user together with the second processing device.

Embodiment 5

Two second processing devices, one is geared towards providing a replaceable display (for later upgrades), the second one geared towards providing easily upgradeable computing power. The first "portable unit 801" is placed in the dash board such that the display is visible for the driver. The second one may be place in a less prominent position such as the trunk or some other hidden position.

Embodiment 6

Vehicle with at least two mounting devices for portable unit 801s.

The illustrations have been discussed with reference to functional blocks identified as modules and components that are not intended to represent discrete structures and may be combined or further sub-divided. In addition, while various embodiments of the invention have been described, it will be apparent to those of ordinary skill in the art that other embodiments and implementations are possible that are within the scope of this invention. Accordingly, the invention is not restricted except in light of the attached claims and their equivalents.

What is claimed is:

1. A system for controlling a content generation system comprising:
a command interface for receiving an issued command of a plurality of commands comprising artist command, song/title command, genre command, and album/filtered list command;
processing means coupled to the command interface comprising non-volatile memory including instructions for receiving the issued command and for causing the content generation system to present content associated with the issued command and including a mode for presentation of additional content after presentation of the content associated with the issued command,
wherein the mode comprises obtaining a summary music identification value from the content being presented in response to the issued command and presenting additional content based on the summary music identification value,
wherein the mode further comprises obtaining a user-varied acceptable range of matching between the summary music identification value of the content being presented and a summary music identification value of the additional content in order to produce different playlists including a first playlist, the acceptable range being user-variable along a ranged scale comprising a plurality of points, wherein each point represents a degree of matching between the summary music identification value of the content being presented and the summary music identification value of the additional content, and wherein playlists that are produced comprise additional content matching the content being presented within the acceptable range, and
wherein the additional content is added to the first playlist, and wherein the additional content in the first playlist is retrieved from at least one non-local source and at least one local source, and
a loudspeaker configured to play back the additional content,
where the issued command is a voice command, and wherein the additional content in the first playlist comprises a first song from the at least one non-local source and a second song from the at least one local source, and
where the mode comprises obtaining meta data of the content associated with the issued command and using the meta data to select additional content, wherein the first song is obtained from an internet streaming service, and wherein the second song is obtained from a local MP3 library.

2. The system of claim 1 where the mode comprises providing sequential partial playback of content until a selection of content is made, and where the at least one non-local source includes internet, satellite radio, and broadcast radio.

3. The system of claim 1 where the mode comprises presenting randomly selected content, and where the at least one local source includes a local digital media library and a local CD.

4. The system of claim 1 where the mode comprises presenting a user with a more like option and a less like option and selecting additional content based on the option selected by the user.

5. The system of claim 1 where the mode comprises matching the content associated with the issued command with a pre-existing playlist and providing additional content from the playlist.

6. A method, comprising:
receiving an issued command of a plurality of commands comprising artist command, song/title command, genre command, and album/filtered list command via a command interface;
presenting content associated with the issued command; and
in a mode for presentation of additional content after presentation of the content associated with the issued command,
obtaining a summary music identification value from the content being presented in response to the issued command,
presenting additional content based on the summary music identification value,
obtaining a user-varied acceptable range of matching between the summary music identification value of the content being presented and a summary music identification value of the additional content in order to produce different playlists, including a first playlist, the acceptable range being user-variable along a ranged scale comprising a plurality of points, wherein each point represents a degree of matching between the summary music identification value of the content being presented and the summary music identification value of the additional content, and wherein playlists that are produced comprise additional content matching, the content being presented within the acceptable range,
wherein the additional content is added to the first playlist from a plurality of sources including at least one non-local source and at least one local source,
where the issued command is a voice command, and wherein the additional content in the first playlist comprises a first song from the at least one non-local source and a second song from the at least one local source, and
where the mode comprises obtaining meta data of the content associated with the issued command and using the meta data to select additional content, wherein the first song is obtained from an internet streaming service, and wherein the second song is obtained from a local MP3 library.

7. The method of claim 6, wherein the plurality of sources includes internet radio, satellite radio, broadcast radio, and the local MP3 library.

8. A system for controlling a content generation system, comprising:
a command interface for receiving an issued command of a plurality of commands comprising artist command, song/title command, genre command, and album/filtered list command;
a loudspeaker,
a processor, and
non-volatile memory including instructions executable by the processor to:
receive the issued command,
cause the content generation system to present content associated with the issued command,
cause the content generation system to present content associated with the issued command, including reproducing the content associated with the issued command via the loudspeaker,
the instructions further including a mode for presentation of additional content after presentation of the content associated with the issued command, wherein the mode comprises:
obtaining a summary music identification value from the content being presented in response to the issued command and presenting additional content based on the summary music identification value,
wherein the mode further comprises obtaining a user-varied acceptable range of matching between the summary music identification value of the content being presented and a summary music identification value of the additional content in order to produce different playlists including a first playlist, the acceptable range being user-variable along a ranged scale comprising a plurality of points, wherein each point represents a degree of matching between the summary music identification value of the content being presented and the summary music identification value of the additional content, and wherein playlists that are produced comprise additional content matching the content being presented within the acceptable range,
wherein the additional content is added to the first playlist,
wherein the additional content in the first playlist is retrieved from at least one non-local source and at least one local source,
playing back the additional content via the loudspeaker,
where the issued command is a voice command, and wherein the additional content in the first playlist comprises a first song from the at least one non-local source and a second song from the at least one local source, and
where the mode comprises obtaining meta data of the content associated with the issued command and using the meta data to select additional content, wherein the first song is obtained from an internet streaming service, and wherein the second song is obtained from a local MP3 library.

* * * * *